United States Patent [19]

Lillquist

[11] Patent Number: 4,751,571
[45] Date of Patent: Jun. 14, 1988

[54] COMPOSITE VISIBLE/THERMAL-INFRARED IMAGING APPARATUS

[75] Inventor: Robert D. Lillquist, Schenectady, N.Y.

[73] Assignee: General Electric Company, Schenectady, N.Y.

[21] Appl. No.: 79,209

[22] Filed: Jul. 29, 1987

[51] Int. Cl.[4] .............................................. H04N 5/33
[52] U.S. Cl. ...................................... 358/113; 358/93; 250/330; 250/332
[58] Field of Search ................... 358/113, 93, 55, 225, 358/81; 250/330, 332

[56] References Cited

U.S. PATENT DOCUMENTS

| 3,588,347 | 6/1971 | Montone et al. | 358/113 |
| 3,742,124 | 6/1973 | Wilson et al. | 358/81 |
| 3,748,471 | 7/1973 | Ross et al. | 250/333 |
| 3,763,357 | 10/1973 | Morton | 235/92 |
| 3,806,633 | 4/1974 | Coleman | 358/81 |
| 4,086,616 | 4/1978 | Catano et al. | 358/81 |
| 4,118,733 | 10/1978 | Sarson et al. | 358/109 |
| 4,162,052 | 7/1979 | Lamelot | 244/3.16 |
| 4,170,987 | 10/1979 | Anselmo et al. | 128/665 |
| 4,220,972 | 9/1980 | Geohezas et al. | 358/166 |
| 4,431,917 | 2/1984 | Gibbons | 250/332 |
| 4,608,597 | 8/1986 | Jaeger | 358/113 |
| 4,608,599 | 8/1986 | Kaneko et al. | 358/113 |
| 4,646,140 | 2/1987 | Bailey et al. | 358/50 |
| 4,679,068 | 7/1987 | Lillquist et al. | 358/44 |

FOREIGN PATENT DOCUMENTS 53-116729 12/1978 Japan .................................. 358/113

OTHER PUBLICATIONS

Martin, T. Z.; "Camera for Monitoring Vegetation", NASA Tech Brief; vol. 9, No. 3; JPL; Sep. 1985.

Primary Examiner—James J. Groody
Assistant Examiner—John K. Peng
Attorney, Agent, or Firm—Paul R. Webb, II; James C. Davis, Jr.

[57] ABSTRACT

Multispectral imaging apparatus for producing a composite dual wavelength visible/infrared image includes a wavelength independent focus reflective optical system for receiving a visible and infrared radiation from a scene and for providing a focused beam of radiation, a beam splitter for splitting the beam into a beam of visible radiation and a beam of infrared radiation, a visible radiation detector for receiving the visible radiation and for producing a first signal, and infrared radiation detector for receiving the infrared radiation and for producing a second signal, and a signal processing and display system for converting the first and second signals into video signals corresponding to a visible black and white image of the scene and a step-tone or false color infrared image of the scene. The images are combined in exact spatial registration to produce a composite image comprising a black and white visible image with portions of the image highlighted in color in accordance with the infrared radiation received from corresponding portions of the scene.

17 Claims, 1 Drawing Sheet

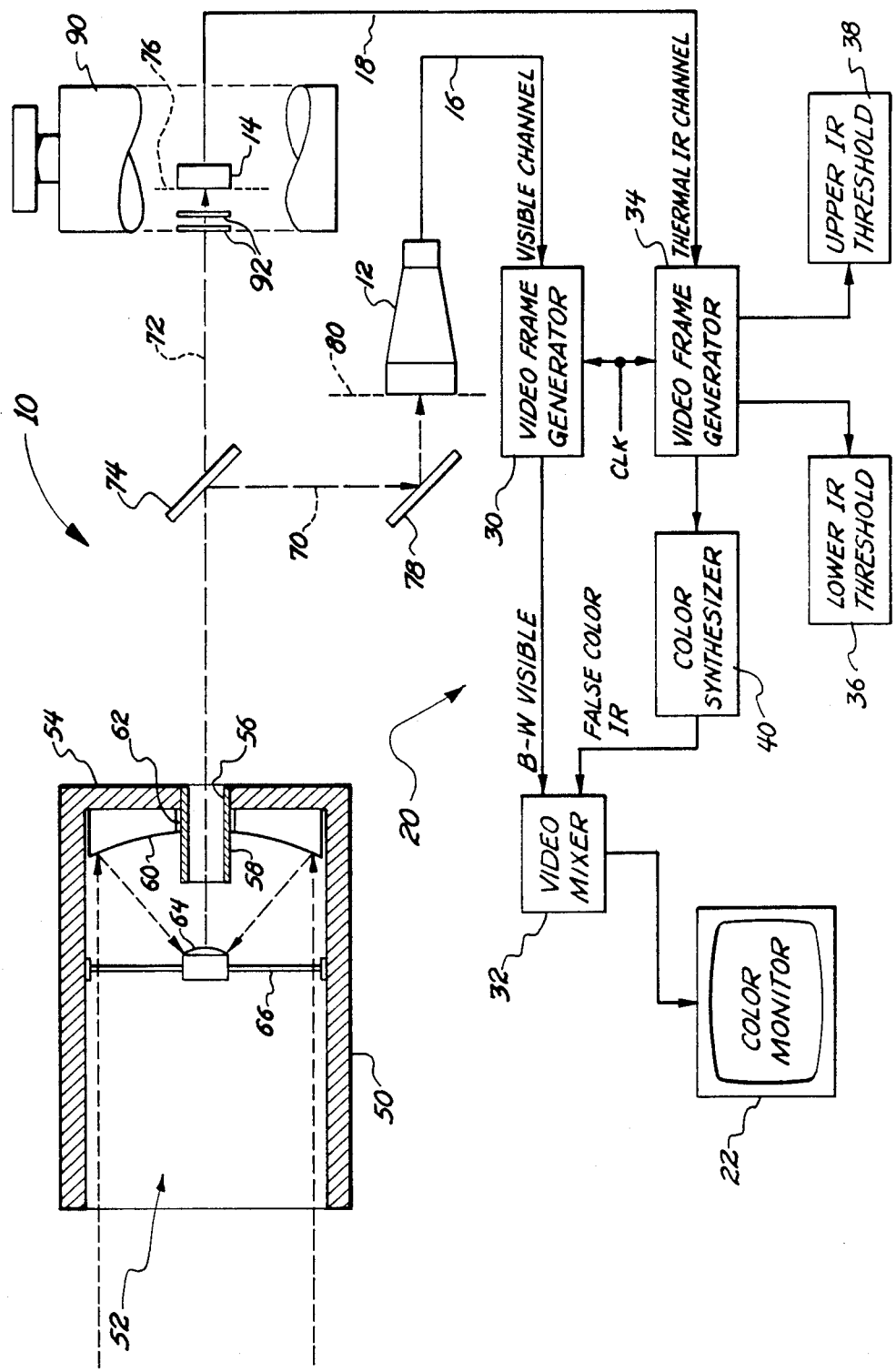

COMPOSITE VISIBLE/THERMAL-INFRARED IMAGING APPARATUS

BACKGROUND OF THE INVENTION

This invention relates generally to multispectral imaging systems, and more particularly, to a dual wavelength band imaging system for producing a composite visible/thermal-infrared image of an object or a scene.

Although the human eye is responsive only to radiation concentrated in the relatively narrow visible light region of the electromagnetic spectrum and is capable of recognizing an object from its reflected light even under poor lighting conditions, all objects reflect or emit nonvisible radiation which is useful for identifying or otherwise characterizing the objects. For example, passive infrared (IR)-thermal imaging (thermography) utilizes the passively emitted thermal radiation from an object as for non-destructive testing, medical diagnosis, surveillance and military target identification, and guidance and tracking. However, it is difficult to recognize even familiar objects from images produced from the object's passively emitted thermal radiation in the infrared spectral region in the absence of familiar visible cues. Under the pressures of simulated or actual combat, even experienced pilots have been known to fire at a "hot" feature revealed by their FLIR (Forward Looking Infrared) display system without being able to identify the target. Even the highest resolution thermal imaging systems can do little to improve this situation because of the fundamental differences in the behavior of matter in the visible and infrared spectral regions. For example, glass and water are transparent to the human eye, but are virtually opaque in the thermal infrared region. Paints and semiconductors are visually opaque, but are partially transparent to infrared radiation. A further complication is that all matter glows to some extent at infrared wavelengths, and an infrared image is, in effect, a radiant temperature map of an object or scene.

Multispectral imaging systems which produce a composite visible/infrared image are known. Such systems have the advantage of combining in a single image both visible and thermal information and are useful in enabling thermal features in a complex scene to be positively located and identified. Previously known systems, however, suffer from several problems, a principle one being the difficulty in obtaining exact spatial registration of the visible and infrared images. In systems which employ separate optical, detection, and image processing and display systems for the visible and thermal-infrared spectral bands, some degree of parallax is unavoidable due mainly to the separate optical trains. While overlaid multispectral images may be formed using digital image processing techniques, it is difficult to achieve exact spatial registration in current digital image processing systems. Also, digital processing of high resolution images is usually not performed in real time because of the extensive computations required. Even systems which have a common optical train have difficulty in achieving spatial registration of the visible and infrared images due to the difficulty in focusing the widely separated visible and infrared wavelength bands. Thus, it is desirable to avoid these problems in a composite dual wavelength visible/thermal imaging system.

In U.S. Pat. No. 4,679,068 issued July 7, 1987, and assigned to the same assignee as this patent application, there is described and claimed a composite visible/thermal infrared imaging system. This multispectral imaging apparatus includes a hybrid visible/infrared radiation detector which is a common focal plane onto which is focused both the visible and the infrared radiation from a scene to provide separate signals to the video imaging portions of the system. These signals are converted to a visible black and white image of the scene and a step-tone false color infrared image of the scene which images are combined in exact spatial registration to produce a composite image.

It is further desirable to provide an improved composite dual wavelength visible/thermal infrared imaging system over that described in the above discussed U.S. Pat. No. 4,679,068 wherein the visible and infrared radiation from a scene are focused at first and second focal planes, respectively, which are located the same distance from the optical system and thus, allows the user a wider choice of visible or infrared detection means.

SUMMARY OF THE INVENTION

The invention affords an imaging system which provides a composite visible image and a thermal-infrared image of a scene with the visible and infrared images in exact spatial registration. The composite image may be displayed on a conventional color motor as, for example, a high resolution black and white visible image with a false color step-tone or saturated white overlay of infrared highlights. Moreover, the invention enables control of the infrared image so that only infrared features having radiances within a preselected range are displayed in order to avoid a cluttered composite image. In addition, different discrete ranges of radiance values may be displayed as different colors, which enables selected thermal features in a complex scene to be positively located and identified.

Briefly stated, in accordance with one aspect, the invention provides multispectral imaging apparatus comprising a wavelength-independent focus reflective optical system for receiving visible and infrared radiation from a scene and for focusing the visible and infrared radiation at first and second focal planes, respectively, which are located the same distance from the optical system; first detector means disposed at the first focal plane for providing a first signal representative of the visible radiation; second detector means disposed at the second focal plane for providing a second signal representative of the infrared radiation; and means responsive to the first and second signals for displaying a composite image of the scene, the composite image comprising a black and white visible image of the scene with portions of the image highlighted in color in accordance with the infrared radiation received from corresponding portions of the scene.

In another aspect, the invention provides multispectral imaging apparatus comprising a non-refractive optical system for receiving visible and infrared radiation from a scene and for providing a focused beam of combined visible radiation and infrared radiation; means for splitting the focused beam into a first beam of visible radiation and a second beam of infrared radiation; first detector means for receiving the first beam and for providing a first signal representative of the visible radiation; and second detector means for receiving the second beam and for providing a second signal representative of the infrared radiation; and means responsive to the first and second signals for displaying a composite image of the scene, the composite image comprising a black and white visible image of the scene with portions of the image highlighted in color in accordance with the infrared radiation received from corresponding portions of the scene.

BRIEF DESCRIPTION OF THE DRAWING

The sole FIGURE is a diagrammatic view of composite multispectral visible/thermal-infrared imaging apparatus in accordance with the invention.

DESCRIPTION OF THE PREFERRED EMBODIMENT

The invention is particularly well adapted to providing a display of a composite visible/infrared image of an object or scene comprising a black and white visible image which is highlighted in color with infrared information, and will be described in that context. However, as will become apparent from the description which follows, this is illustrative of only one utility of the invention.

As shown in the FIGURE, and as will be described in more detail shortly, composite visible/thermal-infrared imaging apparatus in accordance with the invention may generally comprise an optical system 10 for receiving visible and infrared radiation from an object or a scene and for providing a focused beam of radiation which is split into a first beam of visible radiation and a second beam of infrared radiation. The visible radiation is supplied to a first detector 12 which outputs a first signal corresponding to the visible radiation impinging upon the detector, and the infrared radiation is supplied to a second detector 14 which outputs a second signal corresponding to the infrared radiation impinging upon the second detector. The first and second signals are supplied via respective channels 16 and 18 to a signal processing and display system 20 which processes the signals and produces a composite visible/thermal-infrared image of the scene within the field of view of the optical system. The composite image may be displayed on a conventional color monitor 22, for example, and preferably comprises a black and white (B/W) visible image of the scene with portions of the visible image highlighted in color in accordance with the infrared radiation received from corresponding portions of the scene.

As shown in the FIGURE, the output signals from detector 12, which correspond to the visible radiation impinging upon the detector, may be supplied via channel 16 to a first video frame generator 30 which formats the raw signals from the detector into gray scale black and white (B/W) image frames and outputs a corresponding B/W video signal. The video output signal from video frame generator 30 may be supplied to a conventional video mixer 32, the output of which is supplied to the color monitor 22. The video signal from video frame generator 30 is displayed on the color monitor as a B/W visible image of the scene within the field of view of the optical system. Similarly, the signals from detector 14, which correspond to the infrared radiation impinging upon the detector, may be supplied via channel 18 to a second video frame generator 34 which converts the signals into frames of gray scale black and white video signals which are synchronized with the video signals from video frame generator 30. For this purpose, video frame generators 30 and 34 may be driven by a common clock (CLK).

Video frame generator 34 preferably includes an adjustable lower threshold control 36 which enables adjustment of the lower sensitivity threshold of the infrared channel to a preselected value. This control affords an adjustable background threshold and advantageously allows low ambient temperature objects to be eliminated from the infrared display. Thus, only objects or portions of a scene having temperatures greater than a preselected value, i.e., producing infrared radiation greater than a preselected radiance value, are displayed. This is convenient for avoiding cluttering of the resulting composite display with low level background information. Video frame generator 34 may also include a second upper threshold control 38 for setting an upper cut-off level so that objects or portions of the scene having temperatures greater than other preselected value may be eliminated from the display. The two controls 36 and 38 thus afford an adjustable window which may be set so that only infrared signals within the preselected range between the upper and lower threshold limits are displayed. This is convenient for enabling objects or portions of a scene having temperatures within a predetermined temperature range to be highlighted on the display and to be easily identified. If desired, multiple threshold controls may be included to enable multiple adjustable infrared windows to be established.

The video output signal from video frame generator 34 may be supplied to a conventional color synthesizer or color slicer 40 which converts different discrete ranges of the video signal into different colors to produce a steptone false color (or saturated white) video signal corresponding to a color image of all objects within the field of view of the optical system having infrared intensities within the preselected range set by the adjustable threshold controls 36 and 38. The color video signal from the color synthesizer may be supplied to video mixer 32, where it is combined with the B/W video signal from video frame generator 30 to produce a composite image on color monitor 22. The composite image comprises a black and white visible image which is overlaid by a step-tone false color (or saturated white) thermal-infrared image. For reasons which will be described shortly, the black and white visible image and the step-tone false color infrared image are in exact spatial registration. The composite image thus comprises a visible image of the scene or object which is highlighted by infrared features with radiances between the preselected upper and lower threshold limits. Of course, either image may be separately displayed, and the video signals may be supplied to the other devices as desired.

The signal processing and display system 20 comprising the video frame generators, the color synthesizer, the video mixer, and the color monitor may be implemented with standard commercially available devices. Both video frame generators, for example, may be substantially similar and may comprise any commercially available device capable of producing standard U.S. NTSC or European Pal TV video frame signals. The threshold controls 36 and 38 of video frame generator 34 may simply comprise voltage threshold controls arranged such that only signals within the preselected threshold range are converted to a video output. Similarly, color synthesizer 40 may be a commerically available device for converting a gray scale black and white video signal into a color video signal.

Optical system 10, which receives the visible and infrared radiation and provides a focused beam of radiation, comprises a wavelength-independent, non-catadioptric, non-refractive reflective optical system. As indicated in the FIGURE, the optical system preferably includes a reflective Cassegrain telescope, which is advantageous for affording compactness, comprising a cylindrical housing 50 having one end 52 which is open to provide an entrance for the radiation and an opposite end 54 which is closed except for a small diameter centrally located exit aperture 56. A cylindrical tubular member 58 may extend inwardly a short distance into the housing from exit aperture 56, as shown. An annular concave primary mirror 60 may be disposed within cylindrical housing 50 adjacent to closed end 54 with the tubular member 58 extending through an opening 62 in the mirror. A convex secondary mirror 64 may be supported at an intermediate location along the axis of the housing by a support structure 66.

Visible and infrared radiation (indicated by the dotted lines) entering opening 52 is reflected by the concave primary mirror 60 onto the secondary mirror 64, which in turn reflects the radiation so that it exits the housing through tubular member 58 and aperture 56 as a composite beam of visible and infrared radiation which is focused at a predetermined distance from the secondary mirror. The telescope may be focused by a mechanical focusing system (not illustrated) which moves both the primary and secondary mirrors. The primary and secondary mirrors are preferably coated with aluminum, silver, gold or other suitable material which has optimum reflection characteristics at both visible and infrared wavelengths, preferably throughout the 0.4–14 micrometer wavelength range.

The focused beam of radiation from the telescope may be split into a first beam 70 of visible radiation and a second beam 72 of infrared radiation by a silicon beam splitter 74 comprising a thin dichroic semiconductor, such as silicon, mirror. The silicon mirror is transparent at infrared wavelengths longer than approximately 2 micrometers and is reflecting at visible wavelengths. The beam splitter, 74, may also be fabricated out of semiconducting materials other than silicon to change the wavelength limits of either the infrared or visible channel. A gallium arsenide beam-splitter, for example, becomes transparent at approximately 0.9 microns wavelength. Accordingly, the infrared radiation passes through the mirror and is focused at a focal plane 76 at which the infrared detector 14 is located. The visible radiation is reflected by mirror 74 to a fully reflecting imaging erecting mirror 78 which reflects the focused visible radiation to a focal plane 80 at which the visible radiation detector 12 is located. Focal planes 76 and 80 are located the same distance from the secondary mirror 64 of the telescope, and this distance corresponds to the focal point of the telescope. The image erecting mirror 78 for the visible radiation cancels the mirror image reversal caused by the beam splitter 74 so that the image size and orientation is identical at both the infrared and visible focal planes 76 and 80, thus insuring exact image registration in both wavelength channels.

Since the optical system is non-refractive, its focus is wavelength independent. Because of the widely separated visible and infrared wavelength bands and the necessity of providing a common focal plane distance for both the visible and infrared radiation, catadioptric (lens/mirror) and refractive optical systems are not suitable for the composite imaging system since the visible and infrared radiation would not be focused precisely at the same focal plane distance, which would cause problems in producing high resolution images that are in spatial registration.

Visible radiation detector 12 may comprise any conventional imaging detector of visible light, such as a solid state CCD or CID detector array, or a vidicon tube. Visible radiation detector 12 may also comprise any conventional imaging detector of visible light whose low light level response characteristics have been augmented by the addition of an eletro-optic image intensifier device. Also, visible radiation detector 12 and video frame generator 30 may comprise a television camera without the normal imaging lens. Infrared detector 14 may be a conventional focal plane infrared detector array, and may comprise, for example, a mechanically scanned infrared imaging radiometer without the normal imaging lens. For optimum infrared sensitivity, detector 14 is preferably operated at cryogenic temperatures, preferably at the order of 77° K. Accordingly, the detector may be disposed within a liquid nitrogen dewar 90 having infrared transparent windows 92 for admitting radiation. Alternatively, other cooling schemes, such as thermoelectric or Joule-Thompson refrigerators, may be employed for cooling the detector.

While a preferred embodiment of the invention has been shown and described, it will be appreciated by those skilled in the art that changes may be made in this embodiment without departing from the principles and spirit of the invention, the scope of which is defined in the appended claims.

What is claimed is:

1. Multispectral imaging apparatus comprising a wavelength independent focus reflecting optical system for receiving visible and infrared radiation from a scene and for focusing the visible and infrared radiation at respective first and second focal planes which are located the same distance from the optical system; first detector means disposed at the first focal plane for receiving the visible radiation and for providing a first signal corresponding thereto; second detector means disposed at the second focal plane for receiving the infrared radiation and for providing a second signal corresponding thereto; and means responsive to the first and second signals for displaying a composite image of the scene, the composite image comprising a black and white visible image of the scene with portions of the image highlighted in color in accordance with the infrared radiation received from corresponding portions of the scene.

2. The apparatus of claim 1, wherein the optical system is non-refractive.

3. The apparatus of claim 1, wherein the optical system comprises a reflective Cassegrain telescope having movable primary and secondary mirrors for focusing the radiation.

4. The apparatus of claim 1, wherein the optical system comprises means for splitting the radiation into a first beam of visible radiation and a second beam of infrared radiation, and means for directing the first and second beams onto the first and second detector means, respectively.

5. The apparatus of claim 4, wherein the beam splitting means comprising a thin dichroic semiconductor mirror which is transparent to the infrared radiation and which reflects the visible radiation, and wherein the directing means comprises a fully reflecting image erecting mirror positioned to reflect the visible radiation reflected from the mirror to the first detector means.

6. The apparatus of claim 1, wherein the displaying means comprises first means for converting the first signal into a first video signal corresponding to a black and white visible image of the scene, second means for converting the second signal into a second video signal corresponding to a color infrared image of the scene, third means for combining the first and second video signals to produce a composite video signal, and a color display for receiving the composite video signal and for displaying said composite image.

7. The apparatus of claim 6, wherein the second converting means includes means for setting one or more preselected threshold levels such that only a second signal which corresponds to infrared radiation with a preselected intensity range is converted to the second video signal.

8. The apparatus of claim 6, wherein the second converting means comprises means for converting discrete ranges of the second signal into different colors.

9. Multispectral imaging apparatus comprising a nonrefractive optical system for receiving visible and infrared radiation from a scene and for providing a beam of combined visible and infrared radiation which is focused at a predetermined distance from the optical system; means for splitting the focused beam into a first beam of visible radiation and a second beam of infrared radiation; first detector means for receiving the first beam and for providing a first signal corresponding to the visible radiation; second detector means for receiving the second beam and for providing a second signal corresponding to the infrared radiation; and means responsive to the first and second signals for displaying a composite image of the scene, the composite image comprising a black and white visible image of the scene with portions of the image highlighted in color in accordance with the infrared radiation received from corresponding portions of the scene.

10. The apparatus of claim 9, wherein the optical system comprises a wavelength independent focus optical telescope.

11. The apparatus of claim 10, wherein the optical telescope comprises a reflective Cassegrain telescope having movable primary and secondary mirrors for focusing.

12. The apparatus of claim 9, wherein the first and second detector means are located at respective first and second focal planes, and the first and second focal planes are each located at said predetermined distance from the optical system.

13. The apparatus of claim 9, wherein said splitting means comprises a thin dichroic semiconductor beam splitter formed to pass the infrared radiation and to reflect the visible radiation, and a fully reflecting mirror for receiving the visible radiation from the beam splitter and for reflecting the visible radiation to the first detector means.

14. The apparatus of claim 9, wherein the displaying means comprises means for converting the first signal into a first video signal corresponding to said black and white visible image of the scene, second means for converting the second signal into a second video signal corresponding to a color infrared image of the scene, third means for combining the first and second video signals to produce a composite video signal, and color display means for receiving the composite video signal and for displaying said composite image.

15. The apparatus of claim 14, wherein the second converting means includes means for setting a preselected range of levels such that only a second signal which corresponds to infrared radiation within the preselected range is converted to the second video signal.

16. The apparatus of claim 15, wherein the second converting means comprises a video frame generator, and the setting means comprises voltage threshold means for setting upper and lower threshold levels, the threshold means being arranged such that only a portion of the second signal between said upper and lower levels is converted to said video signal.

17. The apparatus of claim 14, wherein the second converting means comprises means for converting discrete ranges of the second signal into different colors.

* * * * *